(12) United States Patent
Watanuki

(10) Patent No.: US 6,532,646 B2
(45) Date of Patent: *Mar. 18, 2003

(54) METHOD OF MANUFACTURING MAGNETIC HEAD

(75) Inventor: Motoichi Watanuki, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/402,816

(22) PCT Filed: Feb. 1, 1999

(86) PCT No.: PCT/JP99/00436

§ 371 (c)(1),
(2), (4) Date: Oct. 8, 1999

(65) Prior Publication Data

US 2002/0053129 A1 May 9, 2002

(30) Foreign Application Priority Data

Aug. 25, 1998 (JP) .......................................... 10-238719

(51) Int. Cl.[7] ........................... G11B 5/127; B24B 51/00
(52) U.S. Cl. ............... 29/603.12; 29/603.16; 29/603.09; 451/5; 451/8; 360/313
(58) Field of Search .................. 29/603.09, 603.12, 29/603.16, 603.17, 603.07; 451/1, 5, 8, 10; 360/313

(56) References Cited

U.S. PATENT DOCUMENTS

| | | | | |
|---|---|---|---|---|
| 5,065,483 A | * | 11/1991 | Zammit | 29/603.14 |
| 5,597,340 A | * | 1/1997 | Church et al. | 451/5 |
| 5,722,155 A | * | 3/1998 | Stover et al. | 29/603.16 |
| 5,913,550 A | | 6/1999 | Watanuki | |
| 5,991,698 A | * | 11/1999 | Hao et al. | 451/8 |

FOREIGN PATENT DOCUMENTS

| | | | |
|---|---|---|---|
| JP | 63-195819 | * | 8/1988 |
| JP | 1-184613 | * | 7/1989 |
| JP | 9-7121 | * | 1/1997 |
| JP | 10-286765 | * | 10/1998 |
| JP | 9-293214 | | 11/1999 |

* cited by examiner

Primary Examiner—A. Dexter Tugbang
(74) Attorney, Agent, or Firm—Greer, Burns & Crain, Ltd.

(57) ABSTRACT

The method of manufacturing a magnetic head comprises the steps of: forming a plurality of layers, which are made from prescribed materials, on a substrate; and forming a plurality of magnetic head elements 12 on the substrate. Using a first ELG element 20, whose size in a prescribed direction is bigger than that of the magnetic head elements 12, and a second ELG element 22, whose size is equal to that of the magnetic head elements, on the substrate, a work piece is lapped, while monitoring resistance of the first ELG element 20 when the resistance of the first ELG element 20 reaches a prescribed value, the amount of lapping the work piece is adjusted on the basis of resistance of the second ELG element 22. Thus, a bar-shaped member can be precisely lapped, the magnetic heads can be manufactured without scattering their characteristics, and yield rate of manufacturing can be improved.

5 Claims, 4 Drawing Sheets

METHOD OF MANUFACTURING MAGNETIC HEAD

FIELD OF TECHNOLOGY

The present invention relates to a method of manufacturing a magnetic head for a magnetic disk drive unit, etc., and more precisely to a method of manufacturing a magnetic head in which a side face of a ceramic bar member, which includes magnetic head elements, is lapped so as to make the magnetic head elements have prescribed characteristics.

BACKGROUND TECHNOLOGY

Magnetic head elements used in magnetic disk drive units, etc. have sensing sections, which are formed by forming magnetic layers, non-magnetic layers, etc. on a wafer-shaped ceramic substrate, and terminals connected thereto. Sliders, which will be respectively assembled in magnetic heads and each of which includes a magnetic head element, are formed by dividing the wafer into pieces.

The magnetic head elements are formed by the steps of forming the sensing sections and terminals in the substrate dividing the wafer into thin bar-shaped members 10 (see FIG. 4); and lapping a side face of the bar-shaped member (work piece). The bar-shaped member 10 is made by cutting the wafer, and tens of the magnetic head elements 12 are arranged therein. A general magnetic head element 12 is shown in FIG. 5. In the drawing, a symbol 14 stands for the sensing section, and symbols 16 stand for the terminals. The sensing section 14 made of a magnetic resistance element. Symbols h, t, w respectively stand for height, thickness and width of the sensing section 14.

In the bar-shaped member 10, the magnetic head elements 12 are arranged, and in each magnetic head element 12 the sensing section 14 is headed to one side face of the bar-shaped member 10. A purpose of lapping the side face of the bar-shaped member is to adjust the height (h) of the sensing sections 14 of the magnetic head elements 12 and to adjust resistance of the magnetic head elements 12 within a prescribed range. The height of the magnetic head elements 12 affects the life span of the elements, and the elements cannot have prescribed characteristics if their resistance are outside of the prescribed range.

In the case of adjusting the height of the sensing sections 14 of the magnetic head elements 12 by lapping the bar-shaped member 10, it is difficult to control the lapping action because the bar-shaped member 10 is very small. In a conventional method of lapping the bar-shaped member, ELG (Electro Lapping Guide) elements are employed.

Record density of the magnetic head elements, e.g., MR head, GMR head, becomes higher and higher. To make the record density higher and to gain higher output power, the magnetic head elements should be thinner and the sensing sections should be lower and narrower. Therefore, if products are manufactured by the conventional method, in which amount of lapping the magnetic head elements is indirectly controlled by using the ELG elements, the products cannot have prescribed accuracy.

To control size of the magnetic head elements by using the ELG elements, positional relationship between the ELG elements and the magnetic head elements must be precisely known. Since the bar-shaped member must be broken and optically measured in order to correctly know the positional relationship between the ELG elements and the magnetic head elements, the positional relationship is known on the basis of the average of sampled data. By employing the average relationship, a difference must occur between the actual relationship between the ELG elements and the magnetic head elements and the average relationship there between. And, resistivity of layers of the ELG elements and the magnetic head elements, the resistance of the terminals, etc. are not fixed, so they affect the accuracy of the products.

Besides the method of employing the ELG elements, a method of adjusting the size and the resistance of the magnetic head elements by monitoring the elements was proposed. However, it is almost impossible to monitor the resistance of the magnetic head elements and control the height of the sensing sections because the width of the magnetic head elements is narrow and the rate of changing the resistance, with respect to the height thereof, is low.

Resistance between the sensing sections and the terminals is greater than that of the sensing sections, so that it is difficult to control the height. Further, the magnetic head elements are easily damaged by static electricity, so they are apt to be damaged by connecting wires for monitoring the elements.

The present invention has been invented to solve the above described problems, and an object of the invention is to provide a method of manufacturing a magnetic head, which is capable of precisely controlling the amount of lapping the bar-shaped member and precisely machining the fine magnetic head elements with higher yield rate.

DISCLOSURE OF THE INVENTION

The method of the present invention comprises the steps of: forming a plurality of layers, which are made from prescribed materials, on a substrate; and forming a plurality of magnetic head elements on the substrate, characterized by the step of forming a first ELG element, whose size in a prescribed direction is bigger than that of the magnetic head elements, and a second ELG element, whose shape is equal to that of the magnetic head elements, on the substrate.

The method may further comprise the steps of: forming a work piece having a prescribed size by cutting a wafer, which includes the substrate and the magnetic head elements, first and second ELG elements formed thereon; lapping the work piece, while monitoring resistance of the first ELG element, until the resistance of the first ELG element reaches a prescribed value; and adjusting the amount of lapping the work piece on the basis of the resistance of the second ELG element.

In the method, a plurality of the first or second ELG elements may be formed. The resistance of the first or second ELG elements are statistically processed, and force pressing the work piece may be adjusted so as to determine the resistance of the first ELG elements or second ELG elements within a prescribed range. With this structure, lapping the bar-shaped member can be correctly controlled when the magnetic head elements are made by lapping the bar-shaped member, so that the magnetic head member can have the prescribed height and prescribed resistance.

Thus, characteristics of the magnetic head elements can be even, and the yield rate of manufacturing can be improved. The method can be effectively applied to the case of making fine elements, e.g., MR head, GMR head. Further, in comparison with the method of monitoring the magnetic head elements only, lapping time can be shorter.

In the method, if a groove is formed in the second ELG element, the second ELG element can be removed when the bar-shaped member is divided.

In the method, if a part of the magnetic head elements acts as the second ELG element, the magnetic head element can be used as a dummy of the second ELG element.

EMBODIMENTS

The present invention will now be described in detail with reference to the accompanying drawings.

Figure 1:
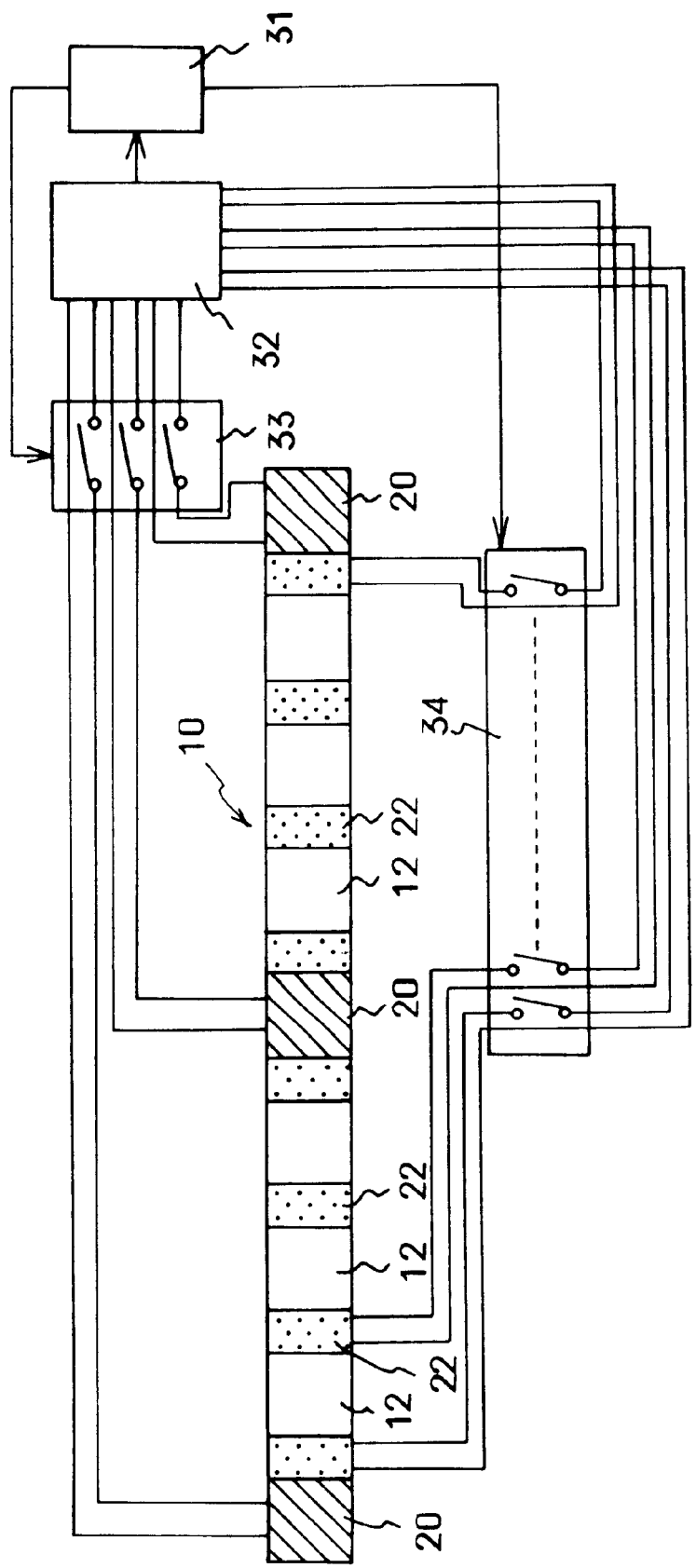
FIG. 1 is a diagram showing first ELG elements and second ELG elements in a bar-shaped member.

FIG. 1 briefly shows a structure of an example of a bar-shaped member 10 in which magnetic head elements 12 including sensing sections of magnetic resistance elements, first ELG elements 20 and second ELG elements 22 are formed. A shape of each first ELG element 20 is similar to that of the conventional ELG element, which is used to detect amount of lapping the bar-shaped member 10. The first ELG elements 20 are mainly used as monitor elements so as to precisely control sizes of the magnetic head elements 12. If the bar-shaped member 10 is deformed, the amount of lapping is partially different, so a plurality of- the first ELG members 20 are provided at both ends and a center of the bar-shaped member 10, with prescribed separations, so as to detect the deformation thereof.

Each second ELG element 22 is located at a mid portion between the adjacent magnetic head elements 12. Since the bar-shaped member 10 will be divided into a plurality of sliders in the following step, there are formed grooves for guiding a cutting blade between the adjacent magnetic head elements 12. The second ELG elements 22 are formed in the grooves. Therefore, the second ELG elements 22 will be removed from products when the bar-shaped member 10 is cut or divided into a plurality of the products.

A symbol 32 stands for a monitor for detecting resistance of the ELG elements; symbols 33 and 34 stand for switches for connecting/disconnecting the monitor 32 to/from the ELG elements; and a symbol 31 stands for a controller for turning on/off the switches 33 and 34 on the basis of results detected by the monitor 32. The resistance of the ELG element is detected by passing fixed electric current through the sensing section and measuring voltage between terminals.

Figure 2:
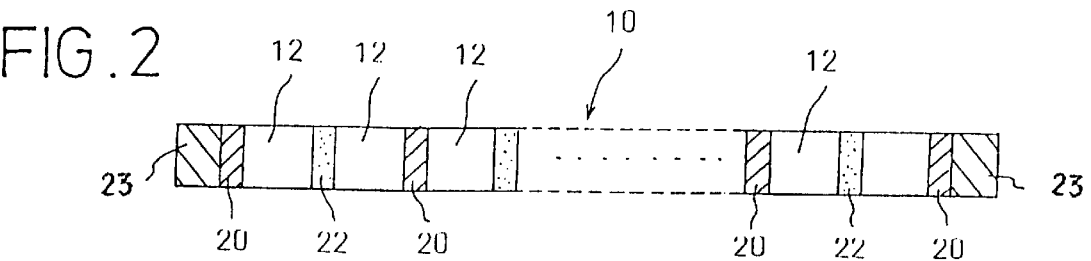
FIG. 2 is a diagram of another example of arranging the first ELG elements and second ELG elements in the bar-shaped member.
Figure 4:
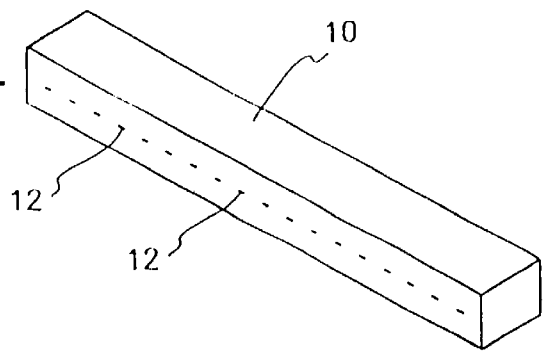
FIG. 4 is a perspective view of a conventional bar-shaped member in which magnetic head elements are formed.
Figure 5:
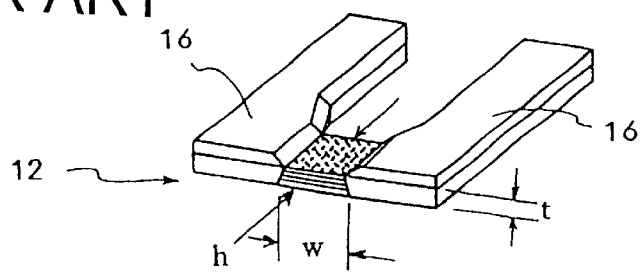
FIG. 5 is a perspective view of a magnetic head element.

FIG. 2 shows another example of the bar-shaped member 10 in which the magnetic head elements are formed. The characteristic point of the bar-shaped member 10 is that the first ELG elements 20 and the second ELG elements 22 are alternately provided in the grooves for guiding the cutting blade. The arrangement of the first ELG elements 20 and the second ELG elements 22 are not limited to the example, and may be optionally arranged. Note that, a section 23 will be optically monitored.

Figure 6:
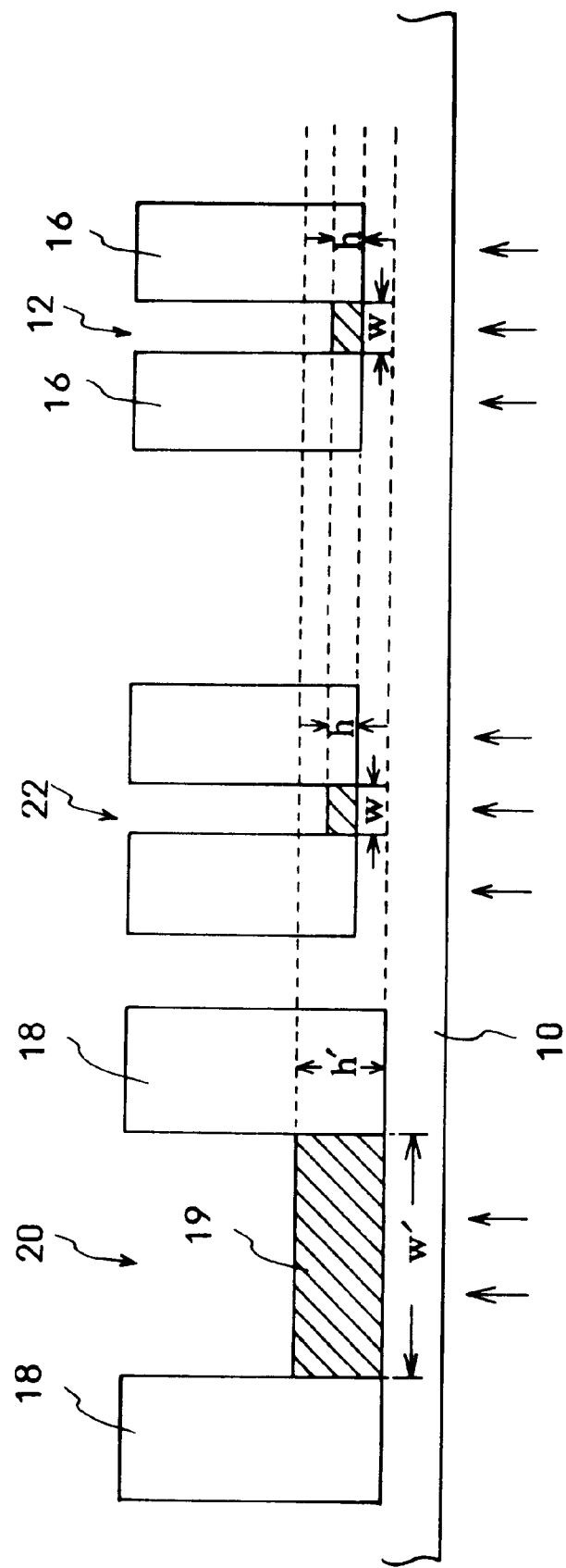
FIG. 6 is a diagram showing a method of lapping the bar-shaped member.

Concept of lapping the bar-shaped member with the ELG elements is shown in FIG. 6. In the drawing, the symbol 20 stands for the first ELG element, and symbols 18 stand for terminals of the first ELG element 20. The first ELG element 20 and the magnetic head element 12 are simultaneously formed in the bar-shaped member 10 by forming layers. The first ELG element 20 includes the sensing 19, which is formed by a magnetic resistance element, so as to detect resistance between the terminals 18. The first ELG element 20 is lapped when the bar-shaped member 10 is lapped. The resistance is changed by lapping, so that height of the sensing section 14 of the magnetic head element 12 can be controlled on the basis of the amount of lapping. In FIG. 6, the bar-shaped member 10 is lapped in the direction of arrows →.

To easily detect the amount of changing the resistance of the first ELG element 20, size of the sensing section 19 is bigger than that of the sensing section 14 of the magnetic head element 12. In FIG. 6, h'>h and w'>w. In the present embodiment, h' is about 21 $\mu$m; h is about 5 $\mu$m; w' is about 110 $\mu$m; and w is about 1.1 $\mu$m. Note that, the thickness of both are almost equal: about 500 angstrom. An end face of the first ELG element 20 is closer to a side face of the bar-shaped member 10 to be lapped than an end face of the magnetic head element 12 so as to recognize the start of lapping the first ELG element 20 prior to the start of lapping the magnetic head element 12 when the bar-shaped member 10 is lapped.

Since the amount of changing the resistance of the first ELG element 20 is correlative to the amount of lapping the magnetic head element 12 (the height h), the change of the resistance of the first ELG element 20 is monitored while lapping, and the lapping is stopped when the resistance reaches a prescribed value. Note that, the resistance of the magnetic head element 12 is indirectly controlled by controlling the size of magnetic head element 12 on the basis of the first ELG element 20.

On the other hand, size of the second ELG element 22 is perfectly equal to that of the magnetic head element 12, their locations with respect to the side face of the bar-shaped member 10 are equal, and they are made from the same materials. Namely, the second ELG element 22 acts as a dummy of the magnetic head element 12. A main purpose of the dummy is to adjust the resistance of the magnetic head element 12 to a prescribed value by monitoring resistance of the second ELG element 22 as the magnetic head element 12.

Since the second ELG element 22 is formed as the dummy element of the magnetic head element 12, the resistance of the magnetic head element 12 can be easily adjusted to the prescribed value by monitoring the resistance of the second ELG element 22 instead of monitoring the resistance of the magnetic head element 12.

When the magnetic head elements 12 are formed on the substrate, the second ELG elements 22 can be simultaneously formed at positions of the second ELG elements 22 by the same layer pattern. The second ELG elements 22 may be formed in all the grooves, and they may be formed with regular separations. Results of monitoring the resistance of the second ELG element 22 are statistically processed.

In the case that the magnetic head element 12 has a reading head and a writing head, the second ELG element 22 may have one head due to its role as a dummy for monitoring. In the present specification, the expression "shape is equal to the shape of the magnetic head element 12" means that planar arrangement, a layer structure and the contact resistance are equal to those of the magnetic head element 12. Note that, in the case of forming no second ELG elements 22, some magnetic head elements 12 may be used as the second ELG elements 22.

Figure 3:
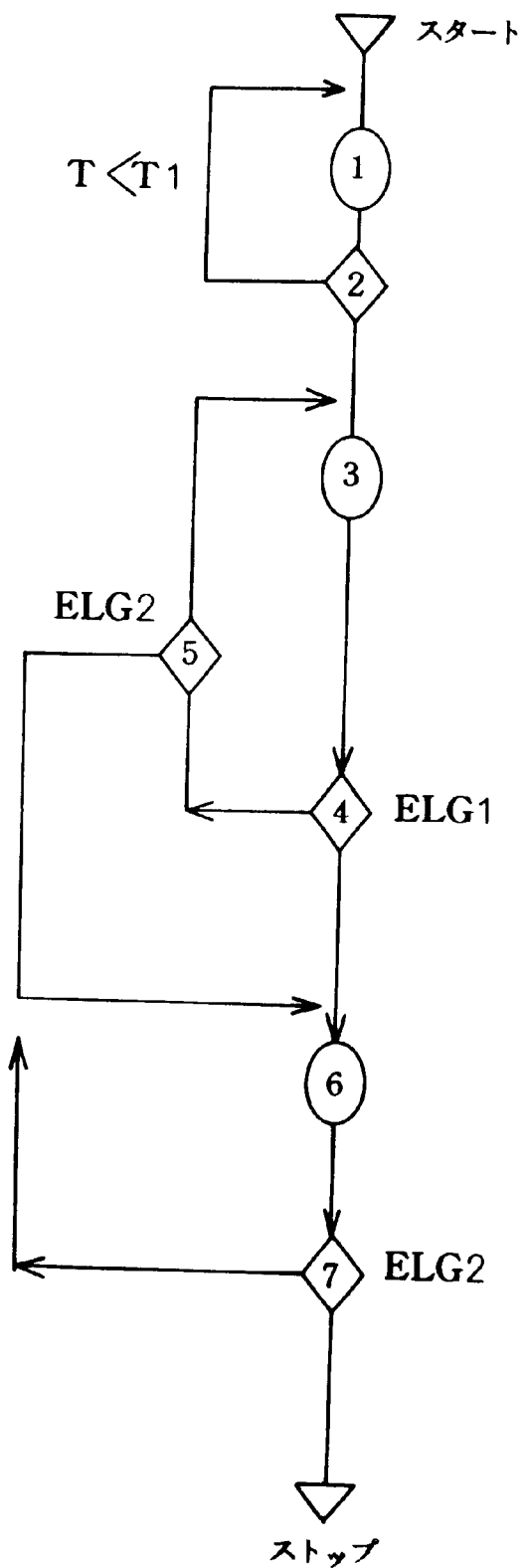
FIG. 3 is a flow chart showing the steps of lapping the bar-shaped members of FIGS. 1 and 2.

Steps of lapping the bar-shaped member 10 including the first ELG elements 20, the second ELG elements 22 and the magnetic head elements 12 will be explained. Details of a lapping machine and a measuring equipment are described in Japanese Patent Kokai Gazette No. 9-293214 and Japanese Patent Application No. 9-89728. A flow chart of lapping is shown in FIG. 3.

(1) Start of Lapping

Upon start, rough lapping (STEP 1) is executed for a prescribed time (T1), then regular lapping (STEP 3) is executed.

In the step of the regular lapping (STEP 3), switch members of the switch 33 are selectively turned on, all switch members of the. switch 34 are turned off, the resistance of the first ELG elements 20 are respectively detected by the monitor 32, and force for pressing the bar-shaped member 10 is adjusted so as to evenly- lap the bar-shaped member 10 without partial difference of the amount of lapping the bar-shaped member 10. To evenly lap the bar-shaped member 10, the controller 31 detects scatter of monitor signals (the resistance values) of the first ELG elements 20, statistically processes the signals, and controls the force for pressing the bar-shaped member 10 so as to scatter the values in a prescribed range.

(2) Regular Lapping

The bar-shaped member 10 is lapped with monitoring the resistance of the first ELG elements 20. At the beginning the changes of the resistance of the second ELG elements 22 are not detected, but the changes of the resistance of the second ELG elements 22 are detected at a certain time point.

The height of the magnetic head elements 12 is controlled on the basis of the detected resistance of the first ELG elements 20; the resistance of the magnetic head elements 12 is controlled on the basis of the detected resistance of the second ELG elements 20.

Namely, in the regular lapping of the STEP 3, the bar-shaped member 10 is lapped on the basis of the detected resistance of the first ELG elements 20 and the second ELG elements 22.

In STEP 4, the heights of the magnetic head elements 12 are judged on the basis of the detected resistance of the first ELG elements 20. In the STEP 4, if the heights of the magnetic head elements 12, which are measured by converting the detected resistance of the first ELG elements 20 which have been statistically processed, are equal to or lower than a prescribed value, which is designed height plus finish margin$\alpha$, the lapping process goes to a finish lapping step (STEP 6).

On the other hand, if the heights of the magnetic head elements 12 are higher than the prescribed value including the finish margin $\alpha$, the lapping process goes to STEP 5 so as to detect the resistance.

The STEP 5 checks if the resistances of the magnetic head elements 12 are equal to or less than a prescribed value or not, and the judgment is made on the basis of the detected resistances of the second ELG elements 22. In the STEP 5, if the statistical results of the resistance of the second ELG elements 22 are equal to or greater than finish margin $\beta$ with respect to the designed resistance of the magnetic head elements 12, the regular lapping is further executed; if that is less than the finish margin $\beta$, the lapping process goes to the finish lapping step (STEP 6).

In the STEPs 4 and 5, if the monitored values are less than the finish margin $\alpha$ for limiting the height of the magnetic head elements 12, which are monitored by the first ELG elements 20, or the finish margin $\beta$ based on the resistance of the magnetic head elements 12, which are monitored by the second ELG elements 22, the lapping process goes to the finish lapping step (STEP 6).

(3) Finish Lapping

In the finish lapping STEP 6, the resistance of the second ELG elements 22 only are monitored to lap and finish the bar-shaped member 10. STEP 7 checks if the statistical results of the detected resistance of the second ELG elements 22 are equal to or less than the prescribed resistance of the magnetic head elements 12 or not. The finish margins $\alpha$ and $\beta$, which have been left in the regular lapping step, are lapped in the finish lapping step, and the finish lapping step will be executed until the statistical results of the detected resistance of the second ELG elements 22 get in a prescribed range.

Note that, in the finish lapping step too, the controller 31 controls the force pressing the bar-shaped member 10 on the basis of monitored or detected values of the respective second ELG elements 22 so as to make the scatter of the resistance of the respective second ELG elements 22 small.

Preferably, in the finish lapping, rotational speed of a lapping plate is made slower, and lapping is executed with peelable abrasive grains.

In the present method capable of controlling the amount of lapping on the basis of the monitored resistance of the second ELG elements 22, since the shape of the second ELG elements 22 is equal to that of the magnetic head elements 12 and the contact resistance, etc. thereof are corrected and monitored, it is advantageous to monitor them as the resistance of the magnetic head elements 12.

As described above, by employing the method in which the bar-shaped member 10 is lapped with monitoring the resistance of the first ELG elements 20 and the second ELG elements 22, the magnetic head elements 12 can be lapped, until reaching the prescribed size, by monitoring the first ELG elements 20, and the resistance thereof can reach the prescribed value by monitoring the second ELG elements 22, so that the bar-shaped member 10 can be more precisely lapped than the conventional one. The size of the sensing sections 14 of the magnetic head elements 12 and the resistance of the whole magnetic head elements 12 are controlled to be within prescribed ranges, so that elements having even characteristics and high reliability can be securely manufactured. Though the second ELG elements 22 are apt to be broken by static electricity, the remaining second ELG elements 22 can monitor even if some of them are broken by the static electricity.

In the present embodiment, a plurality of the first ELG elements 20 and a plurality of the second ELG elements 22 are provided in the bar-shaped member 10. The monitor signals of them are statistically processed, and the amount of lapping the bar-shaped member 10 is controlled on the basis of the statistical results. By the control based on the statistical results, the characteristics of the respective magnetic head elements 12, which are made from the bar-shaped member 10, can be even, and reliable products can be manufactured.

The magnetic head elements, which were made by lapping the bar-shaped member according to the method of the present invention, were compared with the magnetic head elements made by the conventional method. The scatter of the height of the sensing sections of the magnetic head elements of the conventional method was ±0.05 $\mu$m; that of the present invention was reduced to 0.02 $\mu$m. Further, the scatter of the resistance of the magnetic head elements made by the conventional method was ±1.5 $\Omega$; that of the present invention was ±0.5$\Omega$.

Industrial Applicability

As described above, in the case of manufacturing the magnetic head elements for the disk drive units, etc., the method of manufacturing the magnetic head of the present invention can be properly applied to the control of lapping the ceramic bar-shaped member in which the magnetic head elements are formed. Thus, the reliable magnetic head elements having even characteristics can be manufactured.

What is claimed is:

1. A method of manufacturing a magnetic head comprising the steps of:

forming a plurality of layers, which are made from prescribed materials, on a substrate;

forming a plurality of magnetic head elements on said substrate, forming a first ELG element whose height and width are larger than those of said magnetic head elements, and second ELG elements, whose shape and size are equal to that of said magnetic head elements, on said substrate; and lapping said substrate including said plurality of layers, said plurality of magnetic head elements, and said first and second ELG elements;

wherein said step of forming the first and second ELG element is performed prior to said step of lapping.

2. The method according to claim 1, further comprising the steps of: forming a work piece having a prescribed size by cutting a wafer, which includes said substrate and said magnetic head elements, and said first and second ELG elements formed thereon; lapping said work piece with a monitoring resistance of said first ELG element, until the resistance of said first ELG element reaches a prescribed value; and adjusting an amount of lapping said work piece on a basis of resistance of said second ELG element.

3. The method according to claim 2, wherein a plurality of said first or second ELG elements are formed, the resistance of said first or second ELG elements are statistically processed, and a force for pressing said work piece is adjusted so as to determine the resistance of said first ELG element or second ELG elements within a prescribed range.

4. The method according to claim 1, wherein a groove is formed in said second ELG element.

5. The method according to claim 1, wherein a part of said magnetic head elements act as said second ELG element.

* * * * *